June 13, 1933.  H. HOLZWARTH  1,914,339
NOZZLE VALVE FOR EXPLOSION TURBINES
Original Filed Jan. 11, 1929  3 Sheets-Sheet 1

Inventor:
HANS HOLZWARTH
By
Attorneys

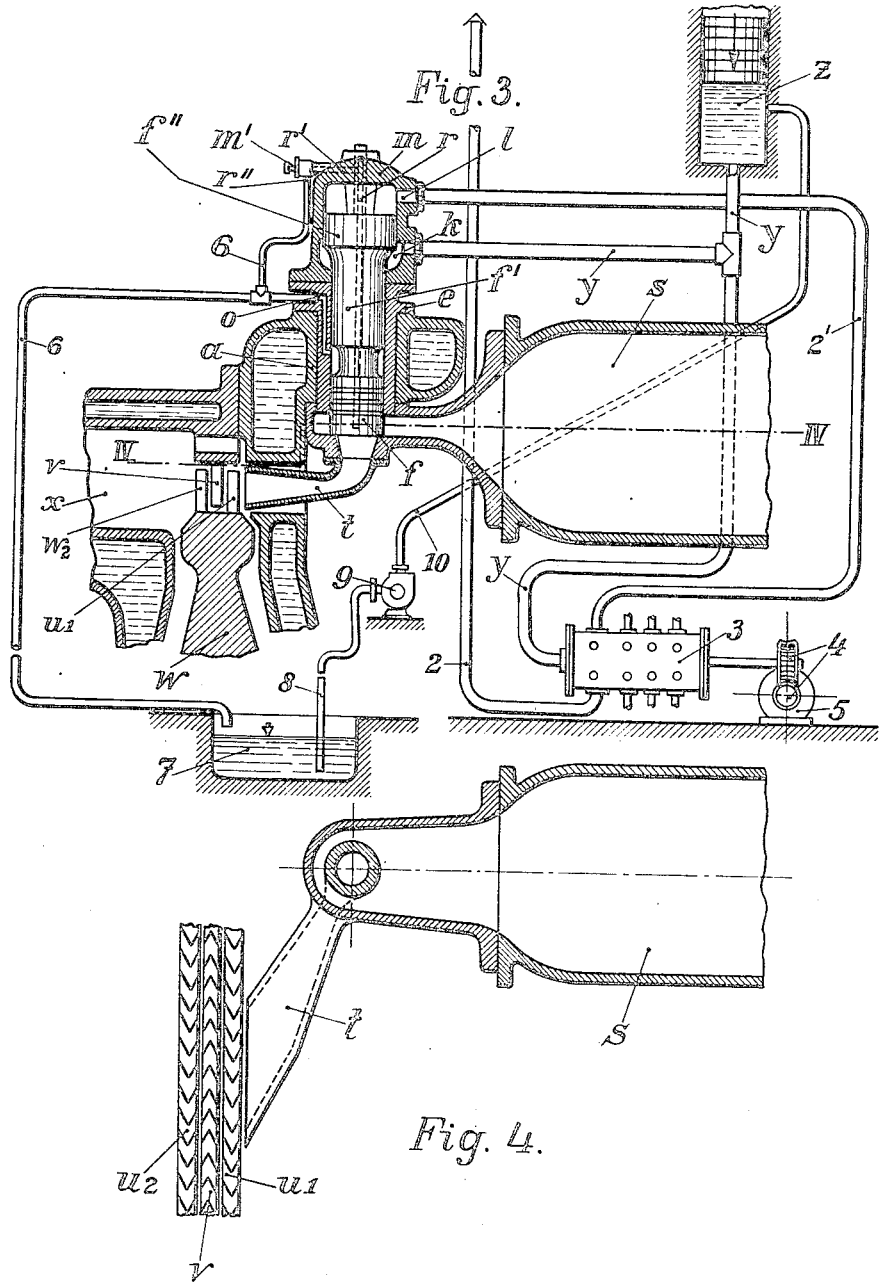

Patented June 13, 1933

1,914,339

UNITED STATES PATENT OFFICE

HANS HOLZWARTH, OF DUSSELDORF, GERMANY, ASSIGNOR TO HOLZWARTH GAS TURBINE CO., OF SAN FRANCISCO, CALIFORNIA, A CORPORATION OF DELAWARE

NOZZLE VALVE FOR EXPLOSION TURBINES

Application filed January 11, 1929, Serial No. 331,854, and in Germany January 31, 1928. Renewed September 2, 1932.

The present invention relates to a nozzle valve arrangement for explosion turbines wherein the valve is operated by oil under pressure, and it is an object of the invention to provide suitable cooling means for such a valve and to use as the cooling medium a part of the oil employed to operate the valve. More specifically, my invention relates to valves of the piston type having opposite surfaces acted upon by oil under different pressures, movement of the valve being effected by release of the pressure against one of said surfaces, one of said pressures preferably remaining constant, the cooling oil being drawn either from the body of oil under constant pressure or from that under variable pressure.

Figure 1:
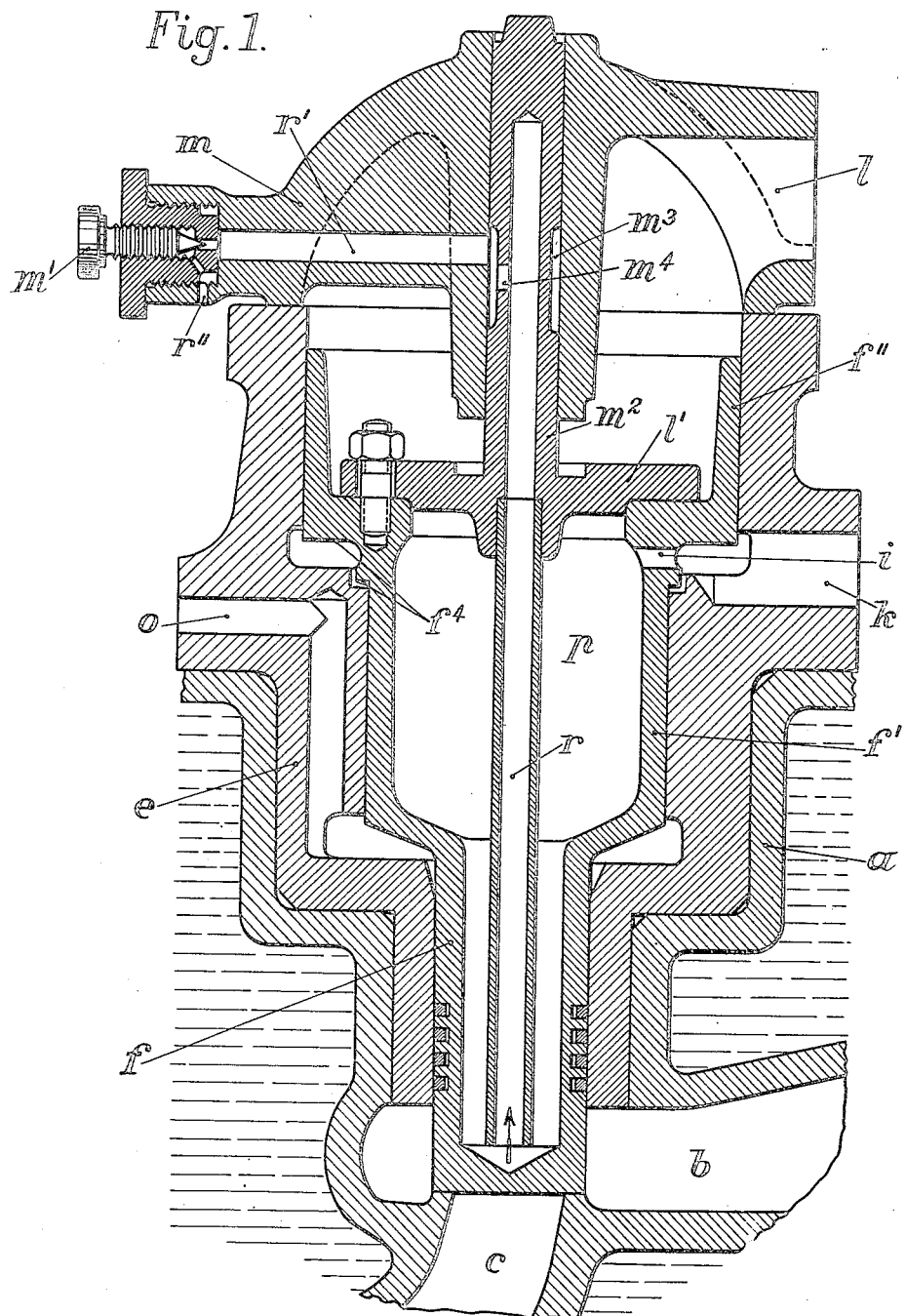
Figure 2:
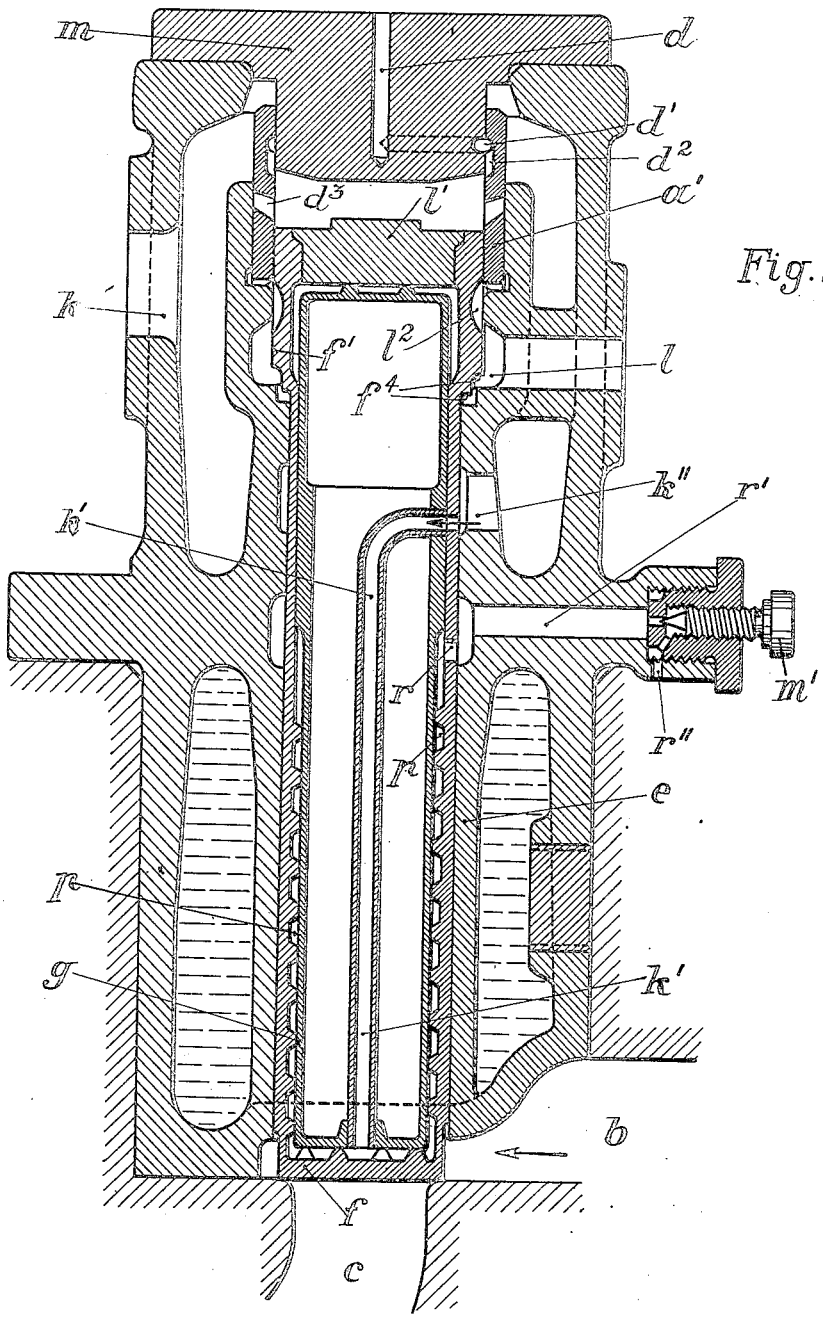

In the accompanying drawings, which illustrate by way of example two forms of my invention without defining its limits, Figs. 1 and 2 show two different embodiments of my invention; Fig. 3 illustrates the arangement of the nozzle valve of Fig. 1 in an explosion turbine of the constant volume explosion type; and Fig. 4 is a section on the line IV—IV of Fig. 3.

In Fig. 1 the letter $e$ indicates a valve casing located in the water-cooled turbine housing $a$. A nozzle valve $f$ is positioned within the valve casing and controls the communication between the interior of the explosion chamber $b$ and the nozzle channel $c$ leading to the turbine rotor. The valve casing has a stepped cylindrical bore in which a piston body composed of sections $f'$, $f''$ of similarly stepped form is adapted to slide. The valve casing is adapted to be closed at its upper end by means of a cover $m$. A source of oil under constant pressure (for example, 7 atmospheres) is adapted to be connected with a bore $k$ in the valve casing, while the inlet $l$ is adapted to be alternately connected with a source of oil at high pressure for controlling the valve (for example, 7 atmospheres) and with an oil discharge conduit at exhaust pressure (zero atmospheres gauge). The bore $o$ serves to conduct away oil that has leaked through between the section $f'$ and the valve casing and is likewise connected with the oil discharge. The oil entering through $l$ exerts a downward pressure upon the top plate $l'$ of the piston, while the effective upward pressure upon the piston of the oil charged through $k$ is exerted against the anular surfaces $f^4$ between the piston sections $f'$ and $f'''$. So long as the valve is subjected to the high oil pressure of 7 atmospheres charged through the opening $l$ it remains closed and forced against its seat, as the area of the plate $l'$ is greater than that of the surface $f^4$ and the unit pressures are substantially the same. As soon, however, as the conduit $l$ is relieved of pressure, the preponderating pressure of the oil charged through conduit $k$ acting against the annular surfaces $f^4$ forces the piston upwardly. The lower surface $f^4$, as shown, is spaced from the adjacent horizontal shoulder on the casing $e$, when the valve is in closed position. The object of this construction is to dampen the shock when the valve is closed, the oil caught between such surface and shoulder, as the valve is forced downwardly, being squeezed out into conduit $k$.

The interior space $p$ of the valve body $f$ is in communication with the annular space below the upper surface $f^4$ between the piston sections $f'$ and $f''$ and therefore also with the conduit $k$ through a bore $i$. A tube $r$ depending from the plate $l'$ projects into said space $p$ and is connected with a bore $r'$ in the cover $m$ through a stem $m^2$ rising from the plate $l'$ and guided in the cover $m$. An opening $r''$ is connected with the bore $r'$ by means of an adjustable throttling member $m'$. The stem $m^2$ is provided with an elongated annular groove $m^3$ which communicates with the interior of the stem through a port $m^4$ and is constantly in communication with the bore $r'$. In this way a portion of the oil under constant pressure is caused to flow continuously out of the conduit $k$, through the space $p$ where it comes in contact with the heated walls of the hollow valve and through the conduits $r$ and $r'$ and the throttle opening $r''$, and in this manner operates to cool the valve.

Fig. 2 shows a second embodiment of my invention and at the same time illustrates the preferred manner of operating the nozzle valve as disclosed in my United States Patent No. 1,700,700, dated January 29, 1929. In this figure the letters $f$, $f'$ represent the piston body which at its lower end forms the valve proper; $e$ indicates the valve casing provided with an oil chamber which is connected through the opening $k$ with a source of oil under constant pressure (which may, for instance, be 2 atmospheres) and is provided also with the bore or conduit $l$ which is connected to the oil pressure valve controlling mechanism, the latter operating to connect the said conduit $l$ alternately and in predetermined timed relation with a source of oil of higher pressure (for example, 7 atmospheres) and with an oil exhaust conduit at substantially zero (gauge) pressure. The cover $m$ is provided with a bore $d$ which is adapted to be in constant communication with a source of oil of a still higher constant pressure (about 30 atmospheres). The bore $d$ communicates through a passage $d'$ with an annular channel $d^2$ in an annular slide valve $a'$ and in the position of the parts shown in Fig. 2 this channel is in communication with the space above the closure plate $l'$ of the piston $f, f'$. The annular slide $a'$ is adapted to initiate the movement of the piston valve in such manner that it can be accomplished with great lifting speed with a small oil requirement. In the position of the parts shown in Fig. 2 the conduit $l$ is under no pressure. As a result, the oil under pressure introduced through conduit $d$ is effective against the plate $l'$ to force the piston body upon its seat. If now, at an instant predetermined by the working cycle of the combustion chamber, pressure oil under 7 atmospheres is conducted through the conduit $l$, such oil will enter an annular groove $l^2$ in the piston section $f'$ and act against the bottom of the annular slide valve $a'$ and force the same upwardly. Such movement of the slide closes the connection between channel $d^2$ and the high pressure oil conduit $d$ and the space above the piston and through openings $d^3$ places such space in communication with the conduit $k$ containing oil under lower pressure (2 atmospheres). The greater pressure in the annular space below the surfaces $f^4$ between the piston sections $f'$ and $f$ then becomes operative to raise the piston body and thus open the valve. Enough of the bottom surface of the slide $a'$ is spaced from the casing $e$, when the slide is in its lower position, to enable the oil of 7 atmospheres entering through $l^2$ to lift such slide. As soon as the conduit $l$ is relieved of pressure, i. e. exhausted, which occurs at a predetermined instant, the piston body moves downwardly under the influence of the oil of 2 atmospheres pressure and when it reaches its lowermost position it restores the connection between the conduit $l$ with the underside of the slide $a'$ through the annular groove $l^2$. Thereupon the slide $a'$ drops through the action of the oil at 2 atmospheres pressure introduced at $k$ and again establishes communication between the source of high pressure oil (30 atmospheres) and the space above the plate $l'$, whereupon the piston valve is held against its seat with great force without requiring the use of high pressure oil for effecting movement of any of the parts.

This manner of operating the piston valve by means of a controlling slide and three sources of oil under different pressures, namely, a low pressure of, for instance, 2 atmospheres, a high pressure of, say, 30 atmospheres and the pressure of the controlling oil mechanism which varies between, say, 7 and 0 atmospheres, produces a very rapid and forcible opening and closing of the valves with a comparatively small expenditure of operating oil charged by such controlling mechanism. This is due to the fact that the operating oil, through the slide $a'$, operates only to relieve the large piston surface $l'$ of the high pressure oil of about 30 atmospheres when the valve is to be opened, the operating oil pressure being sufficient to effect the opening of the valve in spite of the small effective surface $f^4$, and being assisted by the explosion pressure of the combustion gases in the combustion chamber as soon as the valve has been lifted from its seat.

For the purpose of effecting cooling of the valve the piston body $f$ is provided with a hollow cylindrical core $g$, which is adapted to be positioned in spaced relation to the inner wall of the piston body to form a channel therebetween. I prefer to provide either the inner wall of the piston body or the outer wall of the core $g$ with a spiral rib whereby a spiral channel $p$ is formed. This channel at its upper portion is connected through the opening $r$ in the piston body to the conduit or channel $r'$ which is controlled by the adjustable throttle opening $r''$ and at its lower end with the inner tube $k'$ which opens into the chanel $k''$ connected to the inlet $k$. In this manner an additional quantity of oil under the constant pressure of about 2 atmospheres may constantly flow from the channel $k$ through the tube $k'$ and through the spiral channel $p$, and thus cool the valve piston $f, f'$.

It will be clear from the above that by means of the construction described the mass of oil moved up and down with the valve piston is reduced to a minimum and therefore the mass effects of the oil, such as inertia, are avoided.

Figs. 3 and 4 show the arrangement of a valve constructed as shown in Fig. 1 in an explosion turbine of the constant volume type. This turbine comprises, as is well known, a combustion chamber $s$ to which an explosive mixture is periodically charged and in which the combustion takes place. The burnt gases are conducted into the nozzle through the valve $f$ which is controlled and cooled by oil under pressure, as above described, the gases being directed by a nozzle $t$ against a series of blades $u_1$ on the turbine rotor $w$, and after reversal in the stator blades $v$, against the second series of rotor blades $u_2$. The expanded combustion gases exhaust through the channel $x$.

In the contruction of the valve as disclosed in Fig. 1 the space $k$ is constantly under a uniform oil pressure of, say, 7 atmospheres. To obtain such condition the said space $k$ is connected by means of a conduit $y$ (Fig. 3) with an oil accumulator $z$ which is kept under pressure by means of a weight of suitable magnitude. The conduit $l$ of the nozzle valve is alternatingly placed in communication with the pressure oil conduit $y$ which is under a pressure of, say, 7 atmospheres and with the conduit 2 which is under atmospheric pressure, by means of conduit 2'. This alternate connection of conduit $l$ with conduits $y$ and 2 is accomplished by means of a controller 3 having a rotating distributing member operated by a reduction gear 4 driven by a motor 5 and operating in the manner disclosed more fully in my United States Patent No. 877,194. The alternating charging of oil under pressure into channel $l$ and discharging of the same therefrom effects the desired movement of the piston valve $f$ as described above. The portion of the pressure oil which is withdrawn through conduits $r$ and bore $r'$ in heated condition, after cooling the valve, flows through the conduit 6, together with the leakage oil from conduit $o$, to the pressure oil storage 7. As a portion of the pressure oil is constantly being lost for cooling purposes, a corresponding quantity of such oil is sucked up through conduit 8 from the oil storage 7 and forced through conduit 10 to the accumulator $z$ by means of a pump 9.

Variations may be resorted to within the scope of the appended claims without departing from the spirit of the invention.

I claim:

1. An exhaust valve for explosion chambers having a hollow body, hydraulic mechanism for controlling the movements of said valve, a conduit for conducting oil under pressure to said hydraulic mechanism to operate the same, a conduit for conducting a portion of such pressure oil into the interior of said valve body to cool the same, whereby such pressure oil serves both to operate and to cool the valve, and a conduit for withdrawing the heated oil from said valve.

2. An exhaust valve for explosion chambers having a hollow body, hydraulic mechanism for controlling the movements of said valve, a casing provided with a space adapted to be filled with oil under pressure for operating said mechanism, a connection between such space and the interior of said hollow body, whereby a portion of such pressure oil serves to cool said valve, and a conduit for withdrawing the heated pressure oil from the interior of said valve body.

3. An exhaust valve as set forth in claim 1, including an adjustable throttling member in the last-mentioned conduit to control the discharge of oil and thereby maintain the pressure of such oil.

4. An exhaust valve for explosion chambers having a hollow body, hydraulic mechanism for controlling the movements of said valve, a conduit for conducting oil under pressure to said hydraulic mechanism to operate the same, a connection between the interior of said valve body and said conduit, an exhaust conduit, and a conduit adapted and arranged to maintain a continuous connection between the interior of the valve body and the exhaust conduit during the movements of the valve.

5. An exhaust valve for explosion chambers having a hollow body, a core in the interior of said valve body and spaced from the inside walls thereof, a conduit for conducting a cooling medium to the space between the inside walls of said valve body and the outer surface of said core, and a conduit for withdrawing the heated oil from said space.

6. An exhaust valve for explosion chambers having a hollow body, hydraulic mechanism for controlling the movements of said valve, a conduit for conducting oil under pressure to said hydraulic mechanism to operate the same, a core having a closed bottom and arranged in the interior of said valve body and extending to nearly the bottom of said body and spaced therefrom, a conduit for conducting such pressure oil to the space between the inside walls of said valve body and the outer surface of said core, and a conduit for withdrawing the heated oil from said space.

7. An exhaust valve for explosion chambers having a hollow body, hydraulic mechanism for controlling the movements of said valve, a conduit for conducting oil under pressure to said hydraulic mechanism to operate the same, a core located within said valve body and extending to nearly the bottom of said valve body and spaced therefrom, a casing for said valve provided with a space adapted to receive said oil under pressure, a pipe leading from such space and opening at the bottom of said core, whereby oil under pressure is conducted to the space between said casing and valve body, a fixed exhaust conduit, and a conduit for withdrawing the heated oil from said last mentioned space and adapted to maintain communication between such space and said exhaust conduit during the movements of the valve.

8. An exhaust valve suitable for use in explosion chambers, comprising a casing, a hollow body movable in said casing and having a piston surface adapted to be acted upon by a liquid under pressure to actuate the valve, said casing being provided with a passageway adapted to receive a liquid under pressure and conduct the same to said piston surface, a connection between said passageway and the interior of the hollow valve body, a hollow stem rigidly connected to the valve body so as to move therewith and communicating with the interior of such body, a rigid guide for such stem, an exhaust conduit, the outer face of said stem being provided with a groove adapted to remain in communication with said exhaust conduit during the movement of the valve, and a connection between the interior of such stem and said groove, whereby a portion of the valve-operating pressure liquid is caused to circulate through the interior of the valve body to cool the latter.

9. An exhaust valve as set forth in claim 8, wherein said connection is approximately at the top of the valve body, and wherein said stem extends into the interior of the valve body and opens close to the bottom of the valve, whereby circulation of the pressure liquid along the whole length of the valve body is promoted.

HANS HOLZWARTH.